(No Model.)
F. ROSSBACH-ROUSSET.
GAS GENERATING LAMP.
No. 567,773. Patented Sept. 15, 1896.
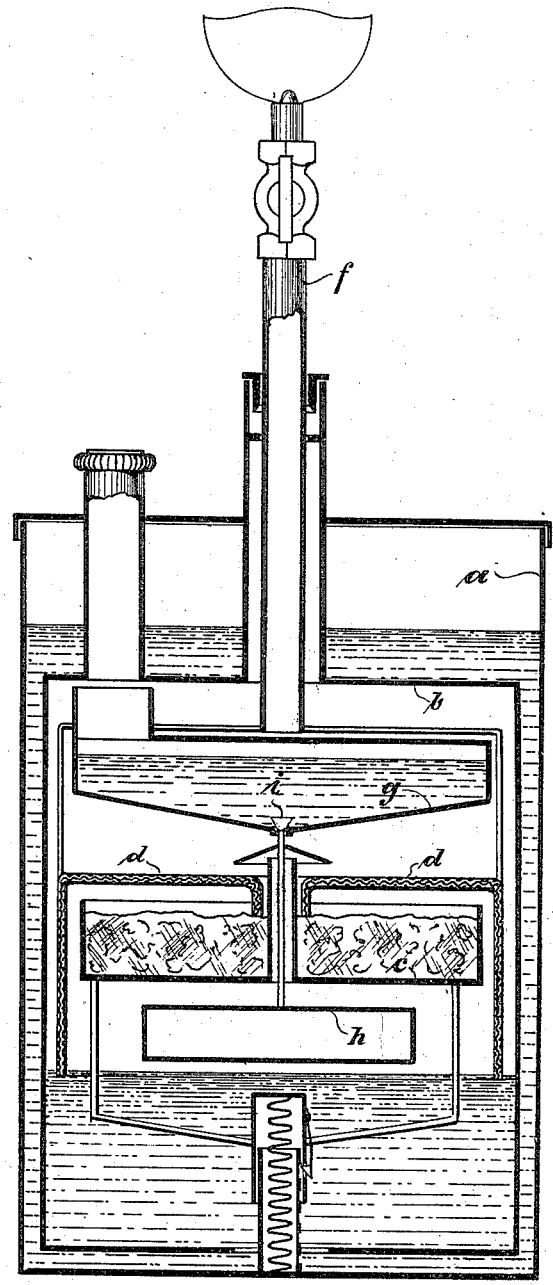
Witnesses:
Inventor:

UNITED STATES PATENT OFFICE.

FRITZ ROSSBACH-ROUSSET, OF TEMPELHOF, GERMANY.

GAS-GENERATING LAMP.

SPECIFICATION forming part of Letters Patent No. 567,773, dated September 15, 1896.

Application filed August 1, 1895. Serial No. 557,913. (No model.) Patented in England June 17, 1895, No. 11,783.

*To all whom it may concern:*

Be it known that I, FRITZ ROSSBACH-ROUSSET, a subject of the German Emperor, residing at Tempelhof, near Berlin, Germany, have invented a new and useful Gas-Generating Lamp, (for which I have obtained a patent in Great Britain, No. 11,783, bearing date June 17, 1895,) of which the following is a specification.

My invention relates to a gas-lamp in which carbide of calcium is subjected to the action of water, so as to generate what is called "acetylene gas," to be burned in my lamp, the said gas being combustible and of a high lighting power; and the object of my invention is to provide means by which the supply of the water is automatically regulated by the pressure of the generated gas, so as to give a uniform and quiet flame without flaring or sooting. I attain this object by the arrangement illustrated in the accompanying drawing, which is a vertical section of the entire lamp.

$a$ is a close vessel containing a gasometer $b$, from the top of which project a supply or inlet pipe for the water and a central guide-tube, both extending through the cover of vessel $a$. The gasometer $b$ is open at the bottom and dips into the water supplied by the inlet-pipe, the level of the water entering the gasometer being obviously depressed as compared with the outer water-level by reason of and in proportion to the pressure of air or gas contained in the gasometer, as shown in the drawing. A pipe $f$ extends through and is guided within the above-mentioned guide-tube and is held at its place by friction. Pipe $f$ is provided with small openings at its upper end, through which escapes the gas to be burned.

$g$ is a receptacle for water connected to a frame, which is supported by the lower end of pipe $f$ and provided with an inlet at the top underneath the supply-pipe of the gasometer $b$ and with a central opening at its bottom. A valve $i$, controlling the said opening, is connected to a float-gage $h$, so as to close the opening or to open it, accordingly to the level of the water entering the gasometer. By these means when supplying water through the inlet-pipe, first, receptacle $g$ is filled up, and then the gasometer $b$ and vessel $a$ are supplied, and there will be discharged water through the central opening of the bottom of receptacle $g$ when the float-gage is in a raised position, so as to open the valve $i$. Another receptacle $c$, containing a block of carbide of calcium, is supported by a frame connected to a box which slides on a tube projecting inwardly from the middle of the bottom of vessel $a$. A spring inserted into the said tube and bearing with its lower end against the bottom of vessel $a$ and with its upper end against the cover of the said box, supports the frame with the receptacle $c$ and presses it upward, a friction-pawl being provided to hold them in any desired position. Receptacle $c$ is provided with a central opening through which passes the stem of valve $i$. Wicks $d$ are supported by the frame connected to the receptacle $g$, the lower ends of the said wicks dipping into the water entering gasometer $b$ and their upper ends being in contact with the block of carbide of calcium, thus supplying the latter with water by the capillarity of the wicks. The gas thus generated is assembled in the upper part of gasometer $b$, from which it escapes through pipe $f$.

The quantity of generated gas being in proportion to the quantity of water supplied to the block, and the quantity of the latter depending on the depth of immersion of the wicks, it will be understood that in the case of being generated more gas than there will escape through pipe $f$, the pressure in the gasometer will increase, and the level of the water entering the gasometer therefore will be lowered so as to decrease the supply of water by lessening the depth of immersion of the wicks, and vice versa.

In order to secure a swifter supply of water when the pressure in the gasometer should sink beyond the average minimum, I have provided the receptacle $g$ and the float-gage $h$, connected to the valve $i$, as heretofore described. By these means when the said decrease of pressure takes place valve $i$ is raised and water is directly supplied to the block through the lower opening of receptacle $g$. An inverted funnel extending from the said opening spreads out the water to a larger extent so as to reach the ends of the wicks which are in contact with the block of carbide of calcium. The supply of water from receptacle g takes place likewise when the lamp is to be lighted, pipe f with its frame having been previously raised when the lamp has been extinguished, so as to withdraw the dipping ends of the wicks from the water in order to prevent generating of gas. The wicks in this raised position being commonly deprived of water, which drops downward, it would be somewhat long when lighting the lamp before the generation of gas begins; but at the same time, there being only the atmospheric pressure in the gasometer, valve $i$ is opened as soon as pipe $f$ is pushed downward to light the lamp, and there will be generated gas at once by the direct supply of water from receptacle $g$.

What I do claim as my invention, and desire to secure by Letters Patent, is—

1. A gas-lamp for burning acetylene gas generated by carbide of calcium subjected to the action of water, consisting of an outer vessel $a$, a gasometer $b$ provided therein and provided with an inlet-pipe and an outlet-pipe extending through the cover of the vessel, a receptacle containing a block or plate of carbide of calcium placed in the gasometer $b$, and wicks with their upper ends in contact with the said block or plate and dipping with their lower ends into the water contained in the vessel $a$ and entering the gasometer $b$, substantially as set forth and for the purposes specified.

2. In a gas-lamp for burning acetylene gas generated by carbide of calcium subjected to the action of water, consisting of an outer vessel $a$, a gasometer $b$ provided therein, and provided with an inlet-pipe and outlet-pipe extending through the cover of the vessel, a receptacle containing a block or plate of carbide of calcium placed in the gasometer $b$, and wicks with their upper ends in contact with the said block or plate and dipping with their lower ends into the water contained in the vessel $a$ and entering the gasometer $b$, a receptacle $g$ to contain water, likewise placed in the gasometer $b$ above the said block or plate and provided with an opening at its bottom, and a float-gage $h$ connected to a valve $i$ fitting in the said opening.

In witness whereof I have hereunto signed my name in the presence of two subscribing witnesses.

FRITZ ROSSBACH-ROUSSET.

Witnesses:
 CHAS. H. DAY,
 W. HAUPT.